R. W. SCOTT.

WELTED KNITTED WEB AND METHOD OF MAKING THE SAME.

APPLICATION FILED MAY 27, 1914.

Reissued Aug. 18, 1914. 13,788.

2 SHEETS—SHEET 1.

Witnesses

M. G. Crozier

Mary F. Griffin

Inventor

Robert W. Scott by Robert S. Clark his attorney

R. W. SCOTT.

WELTED KNITTED WEB AND METHOD OF MAKING THE SAME.

APPLICATION FILED MAY 27, 1914.

Reissued Aug. 18, 1914.

13,788.

2 SHEETS-SHEET 2.

Witnesses

M. S. Crozier,

Mary F. Griffin

Inventor

Robert W. Scott by Robert C. Ames his attorney

UNITED STATES PATENT OFFICE.

ROBERT W. SCOTT, OF BOSTON, MASSACHUSETTS, ASSIGNOR TO SCOTT & WILLIAMS, INCORPORATED, OF PHILADELPHIA, PENNSYLVANIA, A CORPORATION OF PENNSYLVANIA.

WELTED KNITTED WEB AND METHOD OF MAKING THE SAME.

13,788. Specification of Reissued Letters Patent. Reissued Aug. 18, 1914.

Original application filed March 28, 1910, Serial No. 552,002. Divided and application filed July 10, 1912, Serial No. 708,937. Original No. 1,096,566, dated May 12, 1914. Application for reissue filed May 27, 1914. Serial No. 841,394.

REISSUED

*To all whom it may concern:*

Be it known that I, ROBERT W. SCOTT, a citizen of the United States, residing at Boston, in the county of Suffolk and State of Massachusetts, have invented a new and useful Welted Knitted Web and Method of Making the Same, of which the following is a specification.

The object of my invention is to provide a knit structure suitable for the end finish of circular knit webs such as stocking legs, which object I attain in the manner hereinafter set forth, with reference to the accompanying drawings in which—

Figure 1:
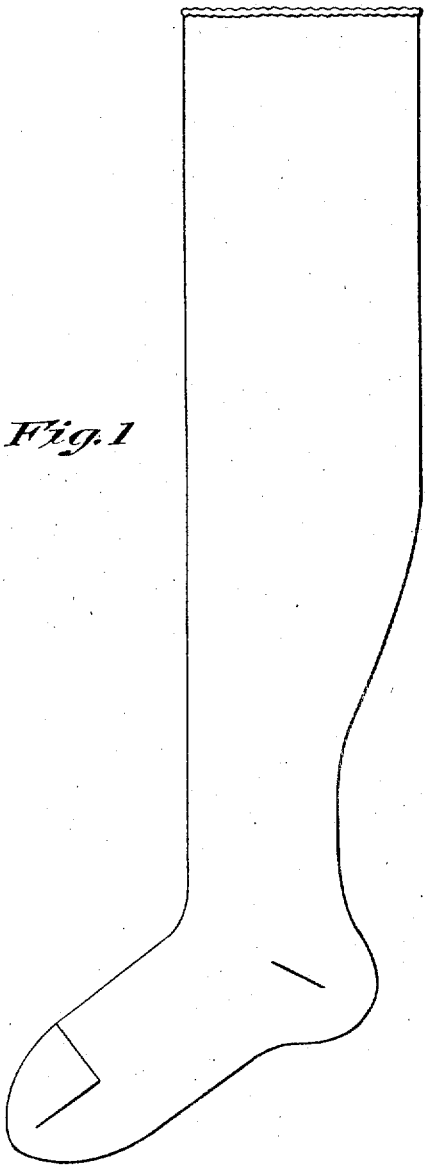
Figure 3:
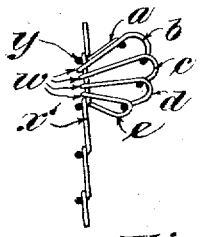
Figure 2:
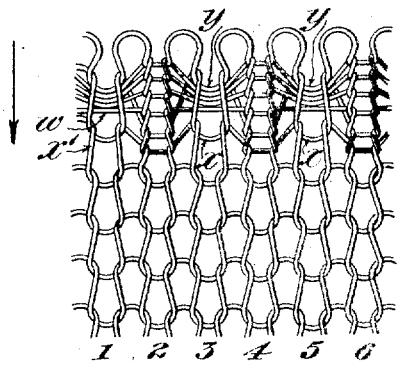
Figure 4:
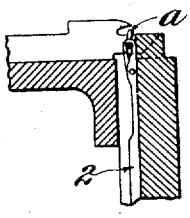
Figure 7:
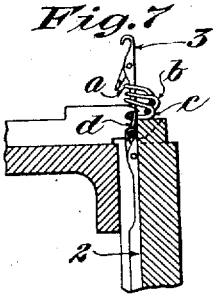
Figure 5:
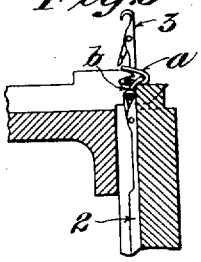
Figure 8:
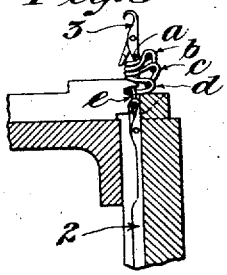
Figure 6:
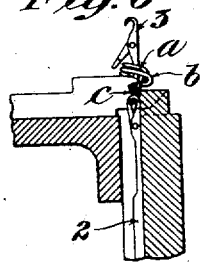

Figure 1 is a view of a stocking provided with my improved welt structure. Fig. 2 is a view on a larger scale of the fabric structure. Fig. 3 is a sectional view showing the welt. Figs. 4 to 10 are diagrams illustrating the formation of the fabric of the welt.

This application is a division of my application Serial No. 552,002, filed March 28th, 1910 (Letters Patent No. 1,045,620, dated November 26, 1912), in which I disclosed a stocking having an integral turned welt produced by the operation of one set of needles only, and therefore capable of being made upon a circular stocking knitting machine without the use of dial needles or transfer implements. As therein disclosed, but not claimed, when a short, bunchy welt is required the loop retaining needles, which may be merely alternate needles or some of the needles of the circular series, may be retired out of action while they are in a projected position, the other needles remaining in action to produce welting courses, so that the sinker wales of said subsequently produced welting courses will all be caught and retained by said retired needles and will thereafter be cast off as a unit when the formation of the welt is completed and the stitches for the remainder of the leg tube are being drawn. A welt of this character contains only a portion of the number of wales of knitting contained in the leg tube.

In order to produce a stocking according to my invention, it being understood that the usual process of manufacture will involve the making of complete stockings—that is, complete except for the closure at the top of the toe thereof—I employ a knitting machine having a complete circle of needles half of which may be retired from action while heel and toe pockets are knit by narrowing and widening operations on the remaining needles, all as usual in the prior art. In addition, I provide for the elevation of certain of the needles at the beginning of the knitting of the leg of the stocking in order to produce a welt of the structure shown in Figs. 2 and 3. Typically this structure is made by retiring, without drawing them below the verge of the needle cylinder, the odd-numbered alternate needles such as the needles employed to knit the wales 1, 3, 5, etc., in Fig. 2. Knitting upon the other or even-numbered needles is continued for a number of courses, for instance, from four to nine courses, the yarns employed in said courses crossing idly in front of the elevated needles upon the shanks of which the loops $y$, the last course knit on all the needles, which may be the first or one of the first few courses laid, are all retained. After the intervening accumulation of sufficient loops by the active needles, which are those of the even numbers 2, 4, 6, etc., of Fig. 2, the needles of wales 1, 3, 5, 7, etc. are restored to operation whereupon the loops $x$, which they drew in the first course following their restoration, will be drawn through the loop $y$ and will include the idle runs, or single wales $w$ of the courses $a$, $b$, $c$, $d$ and $e$ made in the even numbered wales 2, 4, 6, etc. The structure resulting is therefore formed of clusters of stitches, a single wale in width, projecting from the face of the fabric. Because of the manner of the formation of the loops $x$ and $y$, the wale containing these stitches is little elongated, and the welt is composed of a succession of bunches in the welting wales 2, 4, 6, etc., separated by normal fabric in the wales 1, 3, 5, etc., which include as many yarns as there are stitches in the bunches.

It will be noticed that the fabric knit in the wales 2, 4, 6, etc. is formed of stitches facing in the same direction as the remainder or body of the fabric, and that the effect of the loops $x$ and $y$ is to bring the first and last courses thereof together, bending the welt fabric into the outwardly facing bunches or clusters shown. Such a welt, as will be plainly apparent to those skilled in the art, is fast against raveling in the direction of the arrow in Fig. 2, and forms a suitable end-finish for the beginning of a section of fabric, as shown in Fig. 1.

Figure 9:
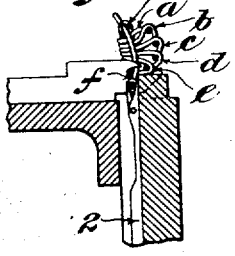
Figure 10:
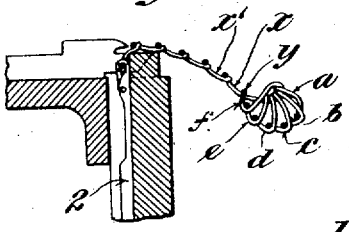

Figs. 4 to 10 show the needle 2, representative of the even-numbered series, respectively at the time of knitting a number of successive courses, the odd-numbered needle 3 representative of alternate loop-retaining needles, being shown in Figs. 5 to 8 retired out of action in a projected position, so that the sinker-wales of the welting courses will all be caught and retained by said needle. Fig. 9 illustrates the needle 3 as having taken the yarn to knit and cast off the accumulated sinker-wale loops of the welting courses as a unit; that is, as about to draw the loop $x$ of Fig. 2. The next following course on all the needles will constitute the first course of the leg-tube proper, shown at $x'$ in Figs. 2 and 10.

While I have referred to knitting the welting stitches upon alternate needles, it will be understood that alternate groups of two or more needles are equally within my invention.

What I claim and desire to secure by Letters Patent is:—

1. A plain fabric stocking having a welt or end finish at the top edge of the stocking composed of clusters of stitches drawn in the same direction as the fabric of the body thereof, separated by wales containing normal stitches.

2. A plain fabric stocking having a welt or end finish at the top edge of the stocking composed of a plurality of courses of stitches in certain wales only, intervening with wales in which there are a less number of stitches drawn to the same face of the fabric, but including the yarn of the first mentioned stitches.

3. A welt structure or end finish for the beginning edge of knit fabric comprising successive courses of stitches knit in the same direction in certain wales only separated by intervening wales comprising a single stitch knit in the same direction including all of the yarns of said courses of stitches.

4. The art of knitting plain fabric stockings or other tubular articles having welts at the edge or end first knit, which consists in first knitting a course of plain fabric, in then knitting in successive courses, in certain or alternate wales only, a plurality of stitches drawn in the same direction as the stitches of the body of the web, without knitting at the intervening wales and in then knitting a course through the last loops of said plurality of stitches and the last loops of said intervening wales, and thereafter knitting plain fabric in continuation of said course.

5. The art of knitting welts for an end finish at the top of circularly knit stockings which consists in withholding the knitting operation upon the loops in certain wales only, in then continuing the operation upon intervening wales to produce projecting clusters of stitches and in then knitting upon the withheld wales to gather together the intervening runs of yarn between said clusters of stitches, and in then knitting plain fabric for a further portion of the stocking.

In testimony whereof I have signed my name in the presence of the subscribing witnesses.

ROBERT W. SCOTT.

Witnesses:
MARY F. GRIFFIN,
M. G. CROZIER.